United States Patent [19]
Chernick et al.

[11] Patent Number: 5,848,234
[45] Date of Patent: Dec. 8, 1998

[54] OBJECT PROCEDURE MESSAGING FACILITY

[75] Inventors: Aubrey Chernick, Los Angeles; Sam Greenblatt, Agoura Hills; William Kenneth Neeley, Los Angeles; Richard Lee Lackey, Rancho Santa Fe; Dannis Yang, West Hills, all of Calif.

[73] Assignee: Candle Distributed Solutions, Inc., Santa Monica, Calif.

[21] Appl. No.: 653,106

[22] Filed: May 24, 1996

Related U.S. Application Data

[63] Continuation of Ser. No. 247,178, May 20, 1994, abandoned, which is a continuation-in-part of Ser. No. 065,926, May 21, 1993, abandoned.

[51] Int. Cl.[6] ................................................. G06F 15/16
[52] U.S. Cl. .............................. 395/200.33; 395/200.32; 395/200.43; 395/800.04; 364/DIG. 1
[58] Field of Search .............................. 395/200.01, 800, 395/200.15; 364/DIG. 1

[56] References Cited

U.S. PATENT DOCUMENTS

| | | |
|---|---|---|
| 4,630,196 | 12/1986 | Bednar, Jr. et al. ................... 364/200 |
| 5,036,459 | 7/1991 | den Haan et al. ..................... 364/200 |
| 5,187,787 | 2/1993 | Skeen et al. .......................... 395/600 |
| 5,257,369 | 10/1993 | Skeen et al. .......................... 395/650 |
| 5,307,490 | 4/1994 | Davidson et al. ..................... 395/650 |
| 5,321,808 | 6/1994 | Rupp ..................................... 395/164 |
| 5,329,619 | 7/1994 | Pagé et al. ............................ 395/200 |
| 5,341,499 | 8/1994 | Doragh ................................. 395/700 |
| 5,381,534 | 1/1995 | Shi ........................................ 395/200 |
| 5,384,890 | 1/1995 | Anderson et al. ........................ 395/2 |
| 5,421,015 | 5/1995 | Khoyi et al. .......................... 395/650 |

Primary Examiner—Alyssa H. Bowler
Assistant Examiner—Dzung C. Nguyen
Attorney, Agent, or Firm—Gates & Cooper

[57] ABSTRACT

Service requests from client objects in a computer network are processed in accordance with the desirability of use of the transport network available for communication with the server objects so that local platform servers are used whenever possible to avoid data marshalling and unmarshalling. A local memory queue is used to hold the service request for interrogation by the local server. Local memory storage may be used to hold data or other portions of the service request so that only minimal data need be processed by the memory queue.

6 Claims, 4 Drawing Sheets

OBJECT PROCEDURE MESSAGING FACILITY

This is a File Wrapper Continuation application of Ser. No. 08/247,178, filed May 20, 1994 now abandoned, which is a Continuation-In-Part application of Ser. No. 08/065,926, filed May 21, 1993 now abandoned.

BACKGROUND OF THE INVENTION:

1. Field of the Invention.

This invention relates to techniques for dealing with calls between objects or other entities in a computer network environment.

2. Description of the Prior Art.

Object oriented computer software and systems utilize entities, called objects, for providing enhanced abilities to design, develop, implement and operate software and other computer related systems. One conventional object related system is known as the object linking and embedding, or OLE, system. Object related systems use various strategies for exchanging data with and between objects. One conventional approach to handling the interchange of data with objects is known as the System Object Model, or SOM, used in the OS/2 operating system.

Another conventional approach for the interchange of data with objects is known as the dynamic data exchange, or DDE, system format used in Windows in the DOS operating system. The DDE system was originally developed for use with non-object oriented systems and modified by means of the SOM for use with object oriented systems through message passing utilizing a system table.

In conventional object oriented systems, the interchange of data with objects is often accomplished with a two phase data exchange procedure. In such conventional two phase data exchange procedures, the first phase or stage includes the communication of a request from the calling or client object which must be acknowledged by the called or server object. Successful completion of the first stage results in the receipt by the client object of the acknowledgement of the communication request by the server object. The data may then be actually exchanged during the second phase of the procedure.

Remote procedure call, or RPC, techniques are known and used for many operations between platforms in a computer network environment but often have overhead requirements, e.g. resulting from required overhead tasks such as marshalling and unmarshalling for data transport between platforms in a network environment, which degrade system. What are needed are techniques for data interchange with both local and remote objects in a network environment which enhance data transfer reliability and do not require the extensive overhead usage of conventional data interchange systems.

SUMMARY OF THE INVENTION

In accordance with one aspect of the present invention, an object procedure messaging or OPM facility is provided for automatic preferred transport selection in which inter-object communications are handled through a specialized procedure, referred to herein as an OPM call, which automatically selects a suitable server in accordance with the desirability of use of the transport associated with that server. If the OPM call can be serviced from the local computer platform, the efficiency of using only local transport will usually cause the local server to be selected as the most preferred server. Inter-object communications which can be satisfied by a local server, that is a server on the same platform as the client object, are able to use an enhanced, extremely efficient local transport mechanism in the form of an internal queuing arrangement using local platform memory, eliminating the need for the client object to wait for a call receipt acknowledgement by the server object.

The conventional two phase data exchange procedure of a remote procedure call, or RPC call, is transparently superseded in an OPM call when the server object is determined to be on the same platform as the client object. The server object is not required to acknowledge the request for communication. The message call from the client object is placed in a local queue, with an object identifier or handle, when the client object makes the call. No further action by, or delay of, the client object is then required except, of course, to wait for any data to be returned by the server.

The local message queue represents a very efficient and reliable transport mechanism. In one embodiment, the data may be stored in a common local memory directly available to both client and server objects. The message queue entry from the client contains the data address of the location in common memory while the returned queue receipt from the object after processing may contain the corresponding output data address. The present invention thereby avoids some of the reduction in system performance inherent with conventional network data interchange techniques by, for example, a) eliminating the need for the generation and receipt of a call receipt acknowledgement from the server to the client in response to a call; b) using a local message queue as a reliable, connected transport thereby eliminating the need to datagram package the data and handle the associated data fragment acknowledgements that would be required by a connectionless transport; and/or c) using shared local memory to eliminate the need to serialize the data during marshalling and unmarshalling for transport.

In accordance with a first aspect of the present invention, when a unit of work required by a client can be performed by more than one server, the client is provided with the ability to select a preferred server. For example, if a unit of work can be performed by either a local server or by a remote server, the local server will likely be selected by the requesting client as the preferred in order to improve system performance by avoiding transport overhead. The client call requesting service is handled by a local broker agent, in Directory Services, which provides an ordered list of servers providing the requested services. This list of servers is ordered in accordance with the transport mechanisms preferred by the requesting client. Default transport preferences may easily be superseded by other preferences stipulated by the user by, for example, inclusion within an environmental variable.

When the available server list, ordered by transport preference, is returned to the requesting client, the current availability to the client of the most preferred server is then determined, for example, by a valid_family function included in the Network Computing Kernal or NCK. If the first listed, and therefore most preferred, transport is not then available to the client, the next most preferred transport is tested or verified by the NCK.

This testing of available servers in the order of transport preference is performed by an RPC enabling function and continued until the most preferred transport to a server providing the requested services has been tested, determined to be available and therefore selected. This procedure insures that the server selection is performed quickly and accurately based on transport preference without the wasted time or other overhead of conventional techniques such as requiring the client to make unnecessary iterative transport calls to determine transport availability.

In the case of a local server, for example, the list of available servers for a local client would of course include the local server. In a typical situation, the local or shared memory through which the local server would be made available to the requesting client would be the most preferred transport. The local server would therefore be tested by the NCK for availability first and if available, would cause the RPC enabling function to select the local server. This assures that not only will the preferred server be selected, but also that servers will be tested in order of their desirability so that the preferred server will be selected with minimum wasted time and effort.

In accordance with another aspect, the present invention provides a method of operating a plurality of operating platforms as a computer network to facilitate communications between client and server objects by selecting an eligible server in response to a request for service from a client object on a first platform, using a network transport between operating platforms to communicate between the client and server objects if the server object is not on the first platform, and using a memory queue on the first platform to communicate between the client and server objects if the server is on the first platform.

In accordance with a further aspect, the present invention provides a method for requesting service from a server object in a computer network environment by requesting a specified service for a client object on a first platform in the computer network environment, obtaining a list of eligible servers from a network services directory in response to the request, testing the availability of each of the eligible servers until one of the eligible servers is determined to be available on the first platform, placing the request for service on a memory queue in the first platform, interrogating the memory queue to determine the presence of a service request directed to the eligible server, and applying the service request to the eligible server on the first platform.

These and other features and advantages of this invention will become further apparent from the detailed description that follows which is accompanied by drawing figures. In the figures and description, reference numerals indicate various features of the invention, like numerals referring to like features throughout both the drawing figures and the description.

DETAILED DESCRIPTION OF THE PREFERRED EMBODIMENT(S)

In accordance with a first embodiment of the present invention, Object Procedure Messaging, or OPM, calls are used for communications between objects. OPM calls operate in generally the same manner as conventional RPC calls for communications between objects on different platforms and in an enhanced mode for inter-object communications on a single platform.

In accordance with the present invention, an OPM call is used to transfer data between objects whether the objects are on the same platform or on separate, homogeneous or non-homogeneous, platforms interlinked by network paths.

An OPM call according to the present invention uses conventional RPC call techniques for inter-platform communications and, for intra-platform communications, provides the operational semantics to ensure that a data transfer request, or other message to an object, is executed only once even if the client and server objects are on the same platform. For intra-platform communications, a message sent to, or waiting for, a busy or otherwise unavailable server object on a common platform may be queued in local memory so that resends to a busy object are not required. OPM calls insure that only one version of a message is processed, thereby substantially enhancing data integrity and facilitate the selection of the most convenient and efficient server based on transport preference.

In accordance with other aspects of the present invention, described below in greater detail with regard to FIGS. 5 and 6, the OPM facility is involved with detection of local server requests, and with server selection and availability testing based on the order of preference of the transport mechanisms usable by each such server.

The OPM call facility provides a set of object services that are made available to all objects. These services include common naming and/or directory facilities for identifying the destination object of a message call so that, for example, messages for a busy object may be held in a queue and conveniently identified or retrieved by the destination object.

The OPM facility is compliant with the Object Management Architecture, or OMA, of the Object Management Group. The name service creates an object name space that accesses names and data from existing directory services.

OPM facilities according to the present invention utilize client and server object stubs to shield the client and server objects from the details of communication between the objects. The client or calling object which originates the message call, and the server or called object which is to receive the call, are programmed as if they were intended to be linked together. A description of the server interface, that is, the names of the procedures and the types of arguments the server implements, is processed, yielding a client stub and a server stub.

The client stub is linked with the client. To the client, the client stub looks like the server. The server stub is linked with the server. To the server, the server stub looks like the client. The client stub allows the client to operate as if it has received acknowledgement of the message call from an available server, whether or not the server is then actually available. The server stub operates to permit the server to retrieve the message call when the server does in fact become available.

Building applications using the OPM facility of the present invention includes three phases: the compile time, bind time, and call time interceptor phases. The compile time phase involves the development of the client and server stubs. These stubs are defined as part of the definition of the interface written in a network interface description language, or NIDL, based upon predetermined operational behavior, output results and expected input parameters. The stubs are produced as object modules when the interface is complied.

The bind time phase involves the server object making its availability known by registering itself with the appropriate directory services and, when appropriate, associating itself with a particular language.

The call time phase involves the local transport protocol, control protocol, and data representation. The transport protocol is used by the stubs to convey arguments and results reliably between objects. The control protocol consists of information included by the OPM facility in each transport packet to track the state of the message. The data representation is a convention for ensuring data compatibility between objects. The OPM facility of the present invention may therefore be considered to include a conventional RPC facility, expressed through a procedural abstraction of the call time components including transport, control, and data representation.

An overview of the OPM facility of the present invention will first be described with regard to FIGS. 1, 2 and 3 to illustrate the intra-platform data and communications paths between objects as well as the inter-platform path which operates in the manner of a conventional RPC facility. Thereafter a more detailed explanation of a conventional RPC facility will be provided with regard to FIG. 4 to serve as an aid in the description of additional embodiments of the present invention shown in FIGS. 5 and 6.

Figure 1:
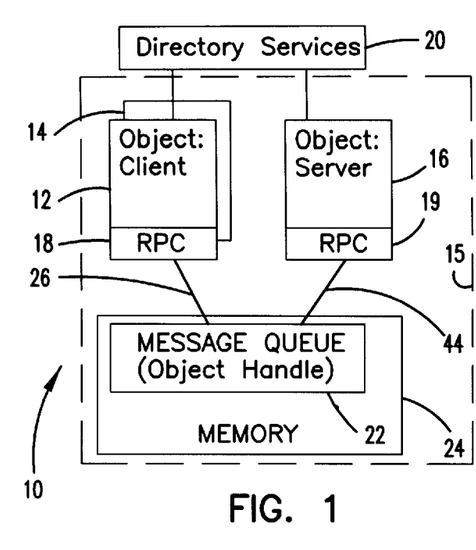
FIG. 1 is a simplified flow diagram of the inter-object data and communication flow path between objects on a common platform during an OPM call in accordance with the present invention.

Referring now to FIG. 1, a simplified flow diagram of intra-platform, inter-object data path 10, according to a first embodiment of the present invention, is presented for exemplar client objects 12 and 14 which—for the purposes of this explanation—are assumed to require communications with server object 16. Client and server objects 11, 14 and 16 are all on the same platform, and therefore can be said to be all on a local platform, represented in FIG. 1 as local platform 15. Using client object 12 as an example, each object is shown to be provided with an appropriate connection to a portion of an RPC interface layer, such as RPC interface portion 18, associated with client object 12. Each client and server object is also provided with a communication path to directory services 20 as well as a communication path to message queue 22. Message queue 22 may conveniently be maintained within local platform memory 24 on local platform 15 and directory services 20 may also be provided locally on platform 15. Alternately, directory services 20 may be provided on another platform made available to local platform 15 by network transport services, as described below with regard to FIGS. 4, 5 and 6, while at most only a copy or partial copy of directory services 20 is maintained on local platform 15.

Intra-platform path 26, between client object 12 and server object 16 on local platform 15, will be described first as an illustration of the message and data flow path between objects on the same platform when the server object is immediately available to accept and acknowledge the client object message call when made by the client object.

Figure 3:
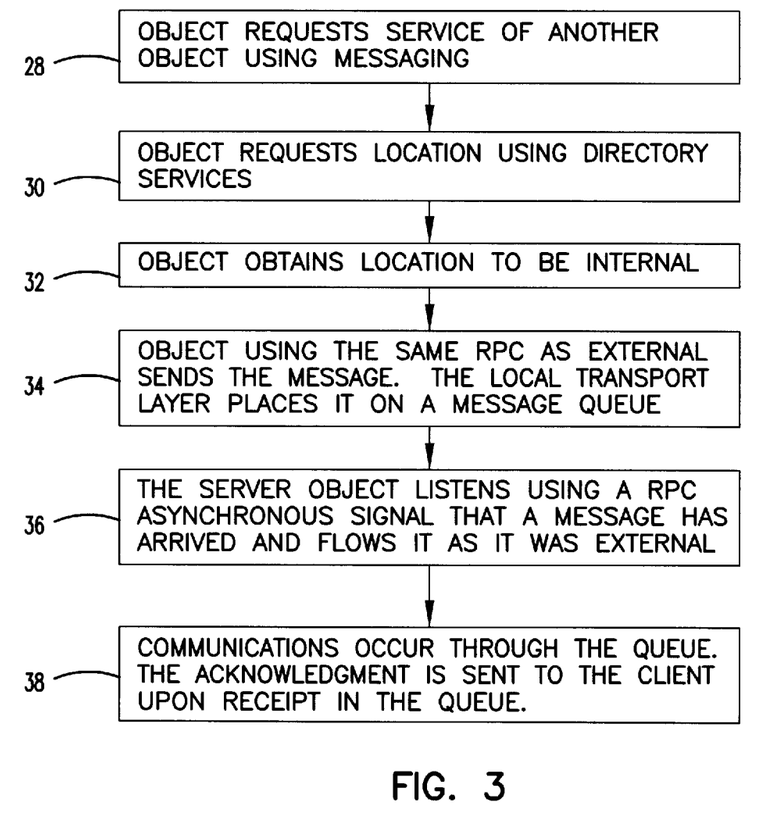
FIG. 3 is a simplified flow chart of an OPM call according to the present invention.

Referring also to FIG. 3, in which a simplified flow chart of an OPM implementation according to the present invention is presented, the first step in forming intra-platform path 26 is step 28 in which an object, such as client object 12, requests service from another object, such as server object 16. Step 28 may be accomplished using conventional messaging facilities for individual objects. The details of the particular messaging facility used are dependent upon the local platform and language and may be conveniently determined by a person of ordinary skill in this art by reference to the appropriate available descriptions thereof.

As a result of step 28, client object 12 requests information concerning the location of server object 16 by interrogating directory services 20 as indicated by step 30. In a local platform configuration, directory services 20 may conveniently be locally maintained. As noted above, in a multi-platform environment, directory services 20 may conveniently be centrally maintained and/or replicated in whole or in part, on each local platform. The development and use of directory services 20 are well known from conventional RPC systems and need not be described herein in any further detail.

Steps 28 and 30 are common to all intra-platform, client-server communication paths such as path 26, as well as inter-platform data paths, which utilize native RPC facilities, as will be discussed below with respect to FIG. 2. When the result of the interrogation of directory services 20 by the messaging facility of the client object determines that the server object is internal, that is locally resident, as represented by step 32, the intra-platform, inter-object communication paths as depicted in FIG. 1 diverge from the inter-platform, inter-object depicted in FIG. 2. It is important to note, however, that the next step in both intra- and inter-platform data paths uses the RPC facility. In the case of an intra-platform path, such as path 26 depicted in FIG. 1, the RPC facility is used to send the message call to message queue 22 rather than to the server object located on a separate platform.

In particular, as indicated by step 34, when interrogation of directory services 20 by the messaging facility of client object 14 indicates that the called object, server object 16, is co-resident on local platform 15, the RPC facility is used to send the message. The local transport layer on local platform 15 places the message on message queue 22. The message call placed on message queue 22 includes an object handle representing server object 16.

As indicated in step 36, server object 16 listens to message queue 22, using a conventional asynchronous RPC signal, to determine if an object handle designating server object 16 has been placed in message queue 22. As indicated in FIG. 1, server object 16 uses RPC interface portion 19 to connect to message queue 22 via server acknowledgement and listening path 44. As indicated by step 36, when server object 16 determines that a message call to server object 16 has been placed in message queue 22, server object 16 causes that message call to be transferred to server object 16 by flowing that message call to server object 16 via server acknowledgement and listening path 44 as if server object 16 were located on an external rather than local platform.

As indicated by step 38, the communications between server object 16 and client object 12 occur through message queue 22. In particular, the acknowledgement of receipt of the message call is sent by server object 16 to client object 12 through message queue 22. If appropriate, data may then be transferred through queue 22 between the client and server objects.

In this manner, it can be seen that when server object 16 is available, intra-platform messaging proceeds between client and server objects, whether or not the server is available when the message call is placed, without substantial delay. It is a substantial advantage of the present invention that the intra-platform message transfer may proceed without delay of the operations of the client object, or retransmission of the message, even when the server object happens to be busy when called by the client object.

It is important to note that, even though server object 16 may be unavailable when called, the use of an OPM call for intra-platform messaging between objects provides the substantial advantage that the client object does not have to wait until the server object is not busy nor are additional or follow-on messages required if the server object is busy when called.

In particular, as indicated in step 36, server object 16 listens to message queue 22 when server object 16 becomes available. Server object 16 uses a conventional asynchronous RPC signal via server acknowledgement and listening path 44 to determine by means of object handles related thereto in message queue 22 when a message call has been placed in message queue 22 for server object 16. As further indicated by step 36, when server object 16 determines that a message call to server object 16 has been placed in message queue 22, server object 16 causes that message call to be transferred to server object 16. As indicated by step 38, the communications between server object 16 and client object 12 occur through message queue 22. In particular, the acknowledgement of receipt of the message call is sent by server object 16 to client object 12 through message queue 22. If appropriate, data may then be transferred through the queue between the client and server objects.

Figure 2:
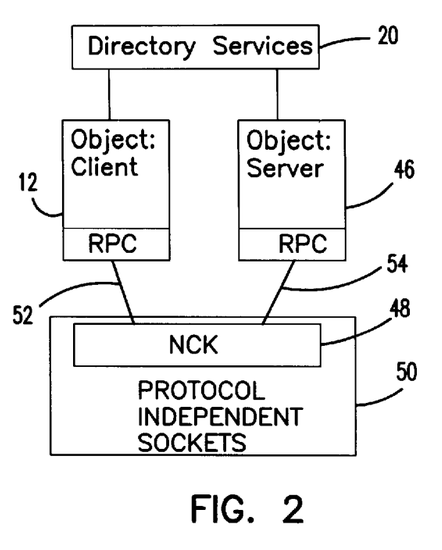
FIG. 2 is a simplified flow diagram of the inter-object data and communication flow path between objects not on a common platform in an OPM call in accordance with the present invention.

Referring now more specifically to FIG. 2, the operation of the external portion of the OPM RPC facility, for example, for multi- and/or inter-platform messaging and data transfer, operates in the same general manner. In particular, when the messaging facility of client object 12 determines by interrogation of directory services 20 that the requested server object, such as server object 46, is not on local platform 15 but some other computer or platform, the external portion of the OPM RPC facility, operates in a conventional manner as a standard RPC facility. That is, client object 12 passes a message call to the network computing kernel (NCK) 48 of protocol independent sockets 50 by means of client RPC path 52 which is acknowledged by server object 46, when available, by means of object RPC path 54.

Figure 4:
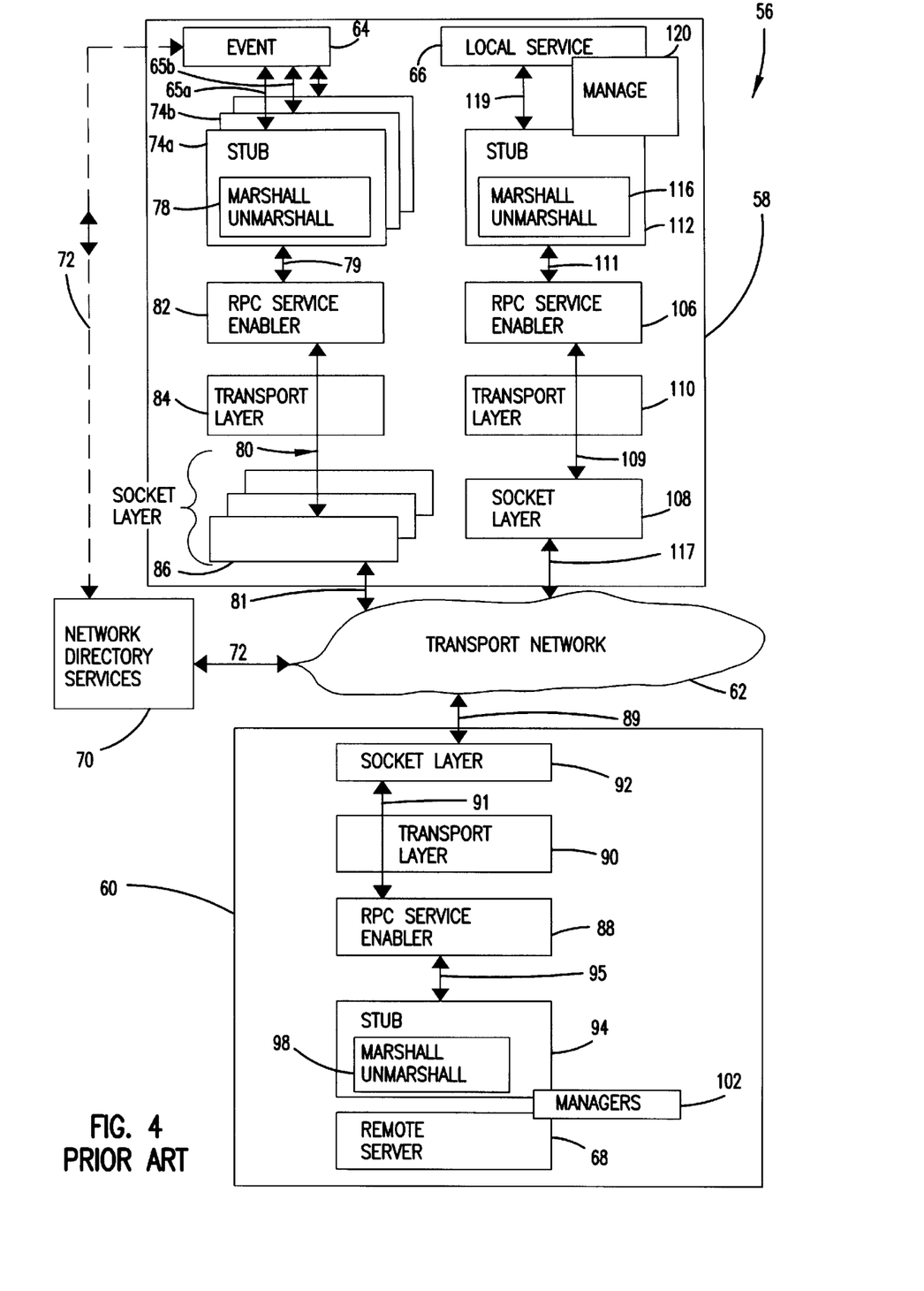
FIG. 4 is a flow diagram of the inter-object data and communication flow path of a conventional RPC call illustrating both the inter- and intra-platform paths.

FIG. 4 is a block diagram of a conventional, prior art computer network 56 in which both inter-platform and intra-platform communications are performed by conventional RPC facilities. This description of a conventional RPC system with regard to FIG. 4 will facilitate the descriptions below, with regard to FIGS. 5 and 6 of further embodiments of the present invention.

Computer network 56 has first operating platform 58 and second operating platform 60 which are coupled by transport network 62. First operating platform 58 and the second operating platform 60 may have the same or different machine architectures, operating systems and/or programming language implementations.

Operating within the first operating platform 58 are objects, such as client 64, the operation of which may require units of work (for example, a file, a directory, a routine, etc.) from one or more other objects, including local server 66 operating within the first operating platform 58 and/or remote server 68 operating within second operating platform 60.

In a conventional manner, the operational behaviors, expected input parameters and output results of the local server 66 are defined as an interface using NIDL statements. These NIDL statements are compiled during a compile time to produce source statements with predetermined programming language syntaxes, such as C or Pascal. The source statements are then compiled using an appropriate compiler to form respective object modules such as local server stub 112 and local server client stub 74a.

Similarly, the operational behaviors, expected input parameters and output results of the remote server 68 are defined as an interface using NIDL statements. These NIDL statements are also compiled to produce source statements which in turn are compiled using corresponding programming language compilers to form respective object modules such as remote server stub 94 and remote server client stub 74b.

Server client stubs 74a and 74b, formed by the interfaces with local server 66 and remote server 68, are linked with client object 64. Linking of the client 64 with server client stubs 74a and 74b is accomplished in a conventional manner by combining respective object modules of client 64 and the client stubs into an executable file.

Local client server stub 112 is similarly linked with local server 66, together with local server manager function 120, to form an executable file. Local server manager function 120 is a set of procedures that implement the operations defined in the interface of local server 66. Remote client server stub 94 is similarly linked with remote server 68, together with remote server manager function 102, to form an executable file. Remote server manager function 102 is a set of procedures that implement the operations defined in the interface of remote server 68.

Objects in the network 56 communicate with each other via transport network 62 in a conventional manner, such as by RPC calls sent from one object to another object. Communication of RPC calls to and from client 64 is performed by a conventional network computing kernel, or NCK, which includes client RPC service enabler 82 that uses an appropriate path selected from local server transport layer 84, and an appropriate handle or socket from client socket layer 86, to enable communication between client 64 and the desired destination object.

Similarly, communication of RPC calls to and/or from local server 66 is performed by the NCK which includes local server RPC service enabler 106. To send an RPC call to a destination object, local server RPC service enabler 106 chooses an appropriate, available transport server from local server transport layer 110 which selects an appropriate socket, or handle, in local server socket layer 108 representing the intended destination object. Local server socket layer 108 provides the necessary communication protocols to enable communication with the destination object represented by the socket or handle selected.

Similarly, communication of RPC calls to and/or from remote server 68 is performed by the NCK which includes remote server RPC service enabler 88. To send an RPC call to a destination object, remote server RPC service enabler 88 chooses a transport server from remote server transport layer 90 which selects an appropriate socket or handle from remote server socket layer 92 that represents the destination object. Remote server socket layer 92 provides the necessary communication protocols to enable communication between remote server 68 and the destination object.

Computer network 56, as shown in prior art FIG. 4, includes directory services 70, which maintains information about resources, such as objects and interfaces, currently available in network 56. Directory services 70 may be centrally maintained in one of the computers within the computer network 56 and/or replicated in whole or in part on each local platform. Directory services 70 includes a global database (not separately shown) for storing the services available from server objects that can be used and accessed by client objects in network 56. Directory services 70 permits server objects to register and unregister themselves and provides look-up and listing functions for client objects in search of services.

At start-up time, or in a bind time phase, local server stub 112 and local server manager function 120 each register with local server RPC service enabler 106 in order to become registered with, that is known to, the NCK. Local server 66 also requests an address assignment from local server RPC service enabler 106. The address assigned includes both an identification of first operating platform 58 as well as an identification assigned specifically to local server 66. Upon address assignment, local server 66 is listed with network directory services 70 to make local server 66 available to clients in computer network 56.

Similarly, at start-up time, or in a bind time phase, remote server stub 94 and remote server manager function 102 each registers itself with remote server RPC service enabler 88 to become known to the NCK. Remote server 68 also requests an address assignment from remote server RPC service enabler 88. The address assigned includes both an identification of second operating platform 60 as well as an identification assigned specifically to remote server 66. Upon address assignment, remote server RPC service enabler 88 is registered with network directory services 70 to make remote server 68 available to client in computer network 56.

To request a unit of work be performed, client 64 sends a request to network directory services 70 to look up servers that can provide the requested service. The request can be via inter-platform path 72 or, if the network directory services 70 resides in the same operating platform as client 64, via direct communication channel 72a which may, for example, be an internal subroutine call. In response to such a request, network directory services 70 returns a list of eligible servers, and their addresses, to client 64 through the same communication channel 72 or 72a.

When the address of an eligible server is received, client 64 transfers execution control to the appropriate client stub 74a or 74b to make an RPC call to the server associated therewith. Because computer network 56 is formed by operating platforms which may have different machine architectures and programming language implementations, the RPC call must be converted in order to be understandable to the selected server. Such conversion is generally referred to as "data marshalling". The reverse process is generally referred to as "data unmarshalling".

In some conventional implementations of RPC, the client stub 74a or 74b performs a data conversion on the RPC call so that the call is converted from the native machine format of client 64 to a predefined "universal" format or to the selected server's native machine format. In accordance with a preferred embodiment of the present invention, data marshalling overhead is reduced by means of a feature in the conventional NCS implementation of RPC in which data related to the data format of the sender, the DREP, is included in the data packet handling header. The receiver is then only required to convert data with representations that differ between the caller and the receiver.

In conventional RPC implementations, data marshalling is performed for all RPC calls except that, in some implementations, data marshalling may be avoided if the host platforms for both the client and server objects are detected to use the same data representation.

Data marshalling is performed by client marshall/unmarshall function 78 incorporated in each client stub 74a and 74b. After undergoing data marshalling, the RPC call is passed to client RPC service enabler 82 through data path 79. Client RPC service enabler 82 uses transport layer 84 and client socket layer 86 to send the RPC call via transport network 62. Client RPC service enabler 82 also tags the identification of client 64 onto the RPC call to let the selected server know that the RPC call was originated by client 64.

Depending upon the selection by the network directory services 70, which is typically based upon the sequence in which server objects were registered, the RPC call may be sent to any eligible server providing the requested service such as local server 66, or remote server 68.

If the selected server is remote server 68, the client socket layer 86 sends the RPC call to transport network 62 through data path 81. From transport network 62, the RPC call is sent through data path 89 to second operating platform 60 and is deposited at an appropriate socket in remote server socket layer 92. Remote server socket layer 92 passes the RPC call to remote server RPC service enabler 88 along data path 91. Remote server RPC service enabler 88 then transfers execution control to remote server stub 94, as shown by program flow path 95. Remote server RPC service enabler 88 is able to locate remote server stub 94 because remote server 68 had already registered itself with the remote server RPC service enabler 88 at start up time.

When remote server stub 94 receives control, it invokes remote server marshall/unmarshall function 98 to convert the RPC call from the network form into the local machine format. After the transformation, remote server manager function 102 is invoked to process the work requested in the RPC call.

If a reply is to be returned to client 64, the reply is sent through the same data path in the reverse direction.

Similarly, if the server provided by directory services 70 is local server 66, client RPC service enabler 82 sends the RPC call through client transport layers 84 and client socket layer 86 to transport network 62 along data paths 80 and 81. From transport network 62, the RPC call is sent to the platform containing the selected server which results, in the case of a local server as now being described, in the return of the RPC call to local platform 58. That is, the RPC call is transferred by transport network 62 to local server socket layer 108 along data path 117 and is then deposited into the socket that belongs to the local server 66. Local server socket layer 108 passes the RPC call to local server RPC service enabler 106 through local server transport layer 110 along data path 109. Local server RPC service enabler 106 then transfers execution control to local server stub 112, as indicated by flow control path 111. Local server RPC service enabler 106 is able to locate local server stub 112 because local server 66 had already registered itself with local server RPC service enabler 106 at start up time.

When local server stub 112 receives control, it invokes local server marshall/unmarshall function 116 to convert the RPC call from the network form into the local machine format in the same manner as discussed above with regard to remote server 68. After the conversion, local server manager function 120 is invoked to process the service requested by the RPC call. If a reply is to be returned from local server 66 to client 64, the reply is sent in the reverse direction along the same data path.

As described, with conventional RPC facilities as shown for example in FIG. 4, an RPC call is sent through transport network 62 even if it is made to a local server on the same platform as client, such as local server 66. Moreover, data marshalling and unmarshalling are typically performed even if an RPC call is sent to a local server operating under the same operating platform. Such operations generally involve substantial overhead and degrade performance of computer network 56.

Figure 5:
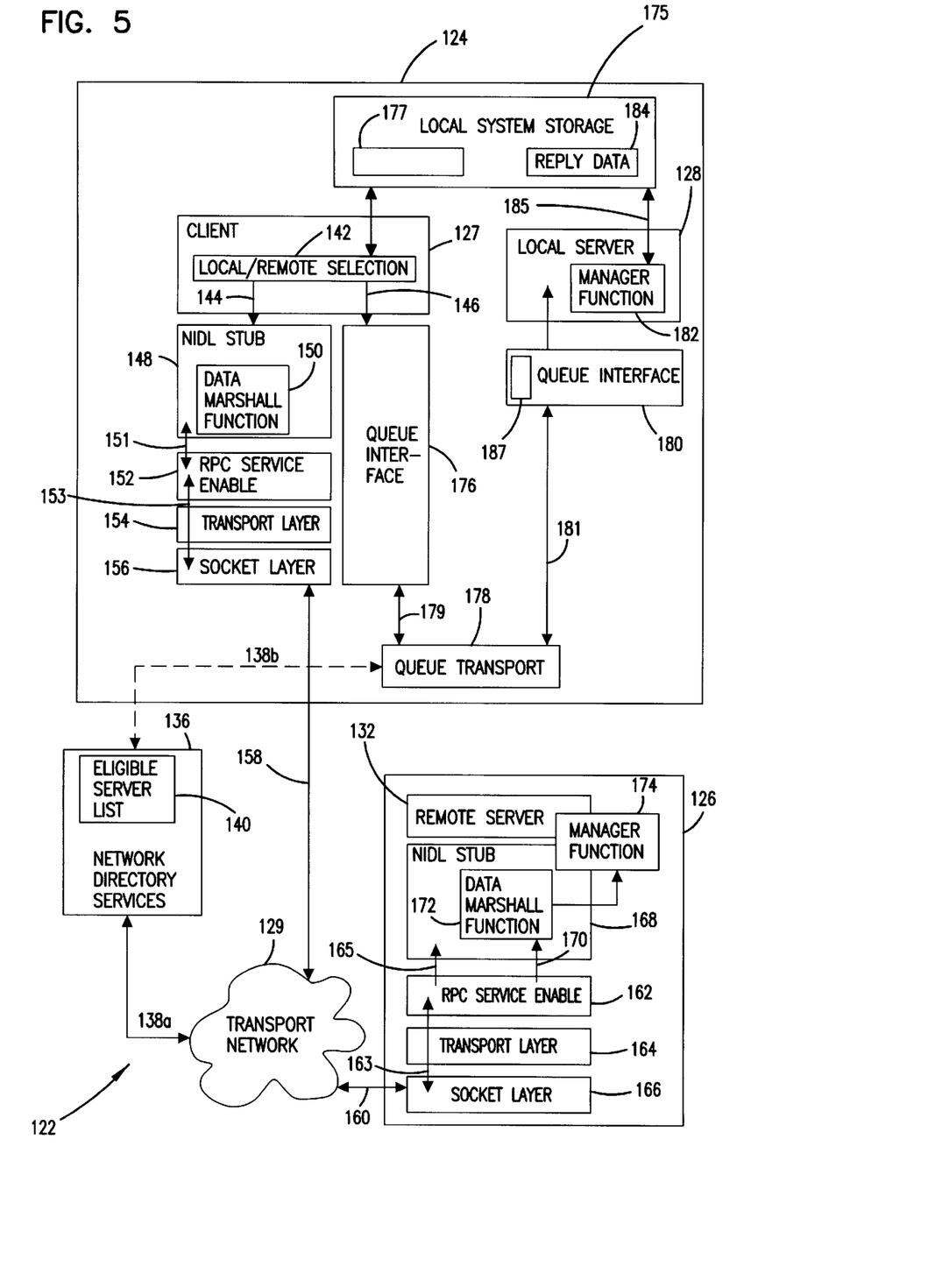
FIG. 5 is a flow diagram illustrating inter- and intra-platform data and communication paths of an OPM call according to a first embodiment of the present invention in which a conventional system is modified so that local server requests are detected and handled by a local queue transport.

As shown in FIG. 5 and following, the present invention can be used advantageously to reduce or eliminate such inefficiency. With reference now to FIG. 5, there is shown a block diagram of computer network 122 wherein an embodiment of the present invention is used to provide enhanced intra-platform communications.

Computer network 122 has first operating platform 124 and second operating platform 126 which are coupled by transport network 129. In these figures, such operating platforms are intended to represent the various platforms that might be connected in a typical computer network in that, from the standpoint of a client object, the server object is either on the same, local platform, or on another platform connected to the client object's platform via of a conventional transport network. First operating platform 124 and second operating platform 126 may have the same or different machine architectures and programming language implementations. operating within first operating platform 124 are objects, such as client 127, the operation of which may require service from one or more other objects, including local server 128 operating on the same operating platform as client 127 and remote server 132 operating on a different operating platform, such as second operating platform 126.

First operating platform 124 has access to a memory, such as local system storage 175, which is available to local objects, including client 127 and local server 128. Local system storage 175 can be organized either as cells, each of which is assigned to a specific object, or as a structured array where new data is placed into the next available indexed slot, or as some other type of conventional data structure.

Using conventional techniques, the operational behaviors, expected input parameters and output results of local server 128, as well as remote server 132 on platform 126, are defined as interfaces using NIDL statements. These NIDL statements are then compiled during compile time to produce source statements with predetermined programming languages syntax, such as C or Pascal, which in turn are compiled using corresponding programming language compilers to form respective object modules including as client and server stubs if needed. The interfaces shown in FIG. 5 for client 127 are client NIDL stub 148 and client queue interface 176. The interfaces for local server 128 are shown as server queue interface 180 and local server manager function 182. The interfaces shown for remote server 132 include server NIDL stub 168 and remote server manager function 174. Additional interfaces may be required for other purposes and/or functions of the interfaces described may be accomplished through other conventional means.

Communication of RPC calls between client 127 and any server is first reviewed by Local/Remote Selection function 142 which first determines if the requested server is local or remote. One convenient way to accomplish this task is to provide Local/Remote Selection function 142 with a list of all local servers, such as local server 128. Any server not listed on such a list of local servers is presumed to be a remote server.

With regard first to remote servers, communication is performed in generally the same manner as provided in a conventional system by RPC calls. In particular, communication with remote server 132 is performed by a network computing kernel (NCK) which includes client RPC service enabler 152, client transport layer 154 and client socket layer 156. In sending an RPC call to remote server 132, client RPC service enabler 152 chooses a transport server from client transport layer 154. In turn, the transport server chooses an appropriate socket from client socket layer 156 which represents remote server 132. Socket layer 156 is responsible for providing the necessary communication protocols to enable communication between client 127 and remote server 132. This communication proceeds via data path 158 to transport network 129 and from there via data path 160 to platform 126.

Once identified as an intra-platform communication of RPC calls, a communication such as between client 127 and local server 128, is performed through client queue interface 176. In particular, computer network 122 maintains directory services program 136, which is a server that provides information about resources (e.g., servers and interfaces) in network 122. Directory services program 136 may be centrally maintained in one of the operating platforms within computer network 122 and/or replicated on each local operating platform. Computer services program 136 maintains a global database including the locations of resources, such as local server 128 and remote server 132, throughout network 122.

At start-up time, local server 128 and local server manager function 182 each registers itself with local server queue interface 180. Local server 128 also requests an address assignment from local server queue interface 180. Upon receiving the address assignment, local server 128 registers itself and its attributes with network directory services program 136 to thereby make itself known in computer network 122.

Similarly, at start-up time, remote server stub 168 and remote server manager function 174 each registers itself with remote server RPC service enabler 162. Remote server 132 requests an address assignment from remote server RPC service enabler 162. Upon receiving the address assignment, remote server 132 registers itself and its attributes with network directory services program 136 to thereby make itself known in computer network 122.

To request a unit of work, client 127 first sends an interrogation to network directory services program 136 to request servers that are eligible to provide the unit of work. The interrogation can be performed by sending an RPC call along path 138*a* from transport network 129 or through direct communication channel 138*b*.

In response to the interrogation, network directory services program 136 returns, through the same path or communication channel, an eligible server list 140 to client 127. Eligible server list 140 contains addresses of servers which are eligible to provide the requested unit of work.

Eligible server list 140 is examined by Local/Remote Selection function 142 which is capable of distinguishing, by checking the assigned address of the server, local server addresses from remote server addresses. If eligible server list 140 contains the addresses of both remote server 132 and local server 128, local server 128 is selected over remote server 132 in order to take advantage of the system services that are native to first operating platform 124, such as system queues, common addressable memory, system interrupts and asynchronous notifications. If the selected server is local server 128, client 127 transfers control to client queue interface 176 via data path 146 as described below in greater detail.

If the selected server is remote server 132, client 127 transfers execution control to client NIDL stub 148 via program flow path 144 to make an RPC call to remote server 132. Upon receiving execution control, client stub NIDL 148 invokes data marshall/unmarshall function 150 to perform a data conversion on the RPC. After undergoing data marshalling, the RPC call is passed to client RPC service enabler 152 through data path 151. Client RPC service enabler 152 tags an identification of client 127 onto the RPC call and invokes client transport layer 154 and client socket layer 156 through control path 153.

Client socket layer 156 sends the RPC call to transport network 129 through data path 158. From transport network 129, the RPC call is sent via data path 160 to second operating platform 126 and is deposited into a socket in remote server socket layer 166. Remote server socket layer 166 passes the RPC, along with the identity of client 127 to remote server RPC service enabler 162 through data path 163.

Remote server RPC service enabler 162 then transfers execution control to remote server stub 168 via program path 165. Remote server RPC service enabler 162 is able to locate remote server stub 168 because remote server 132 had already registered itself with remote server RPC service enabler 162 at start up time.

When remote server stub 168 receives control, it invokes remote server marshall/unmarshall function 172 to convert the RPC call from the network or universal format into the format of platform 126. After the conversion, remote server manager function 126 is invoked to process the unit of work requested in the RPC.

If a reply needs to be returned from remote server 132 to client 127, the reply is sent in the reverse direction along the same data path.

On the other hand, as noted above, if client 127 selects a local server such as local server 128, Local/Remote Selection function 142 places the RPC call into local system storage 175 at predetermined location 177. A pointer to location 177 is obtained in return. The pointer is added to the handle of the RPC.

Because the RPC call does not pass through client NIDL stub 148, data marshalling is not performed on the RPC.

Client 127 Local/Remote Selection function 142 passes the handle to client queue interface 176 through data path 146. Client queue interface 176 in turn places the handle onto queue transport 178 through data path 179.

From queue transport 178, the handle is received by local server queue interface 180 through data path 181. When local server 128 is available, local server queue interface 180 passes the handle to local server 128 through data path 183. Local server 128 uses the pointer to retrieve the RPC call from location 177 in local system storage 175 through data path 185. After the RPC calls are retrieved, local server 128 invokes local server manager function 182 to process the RPC. If local server 128 is unavailable, the handle is put into first-in-first-out queue 187 in local server queue interface 180 to await processing.

If a reply needs to be returned from local server 128 to client 127, the reply is sent in the reverse direction along the same data path.

Figure 6:
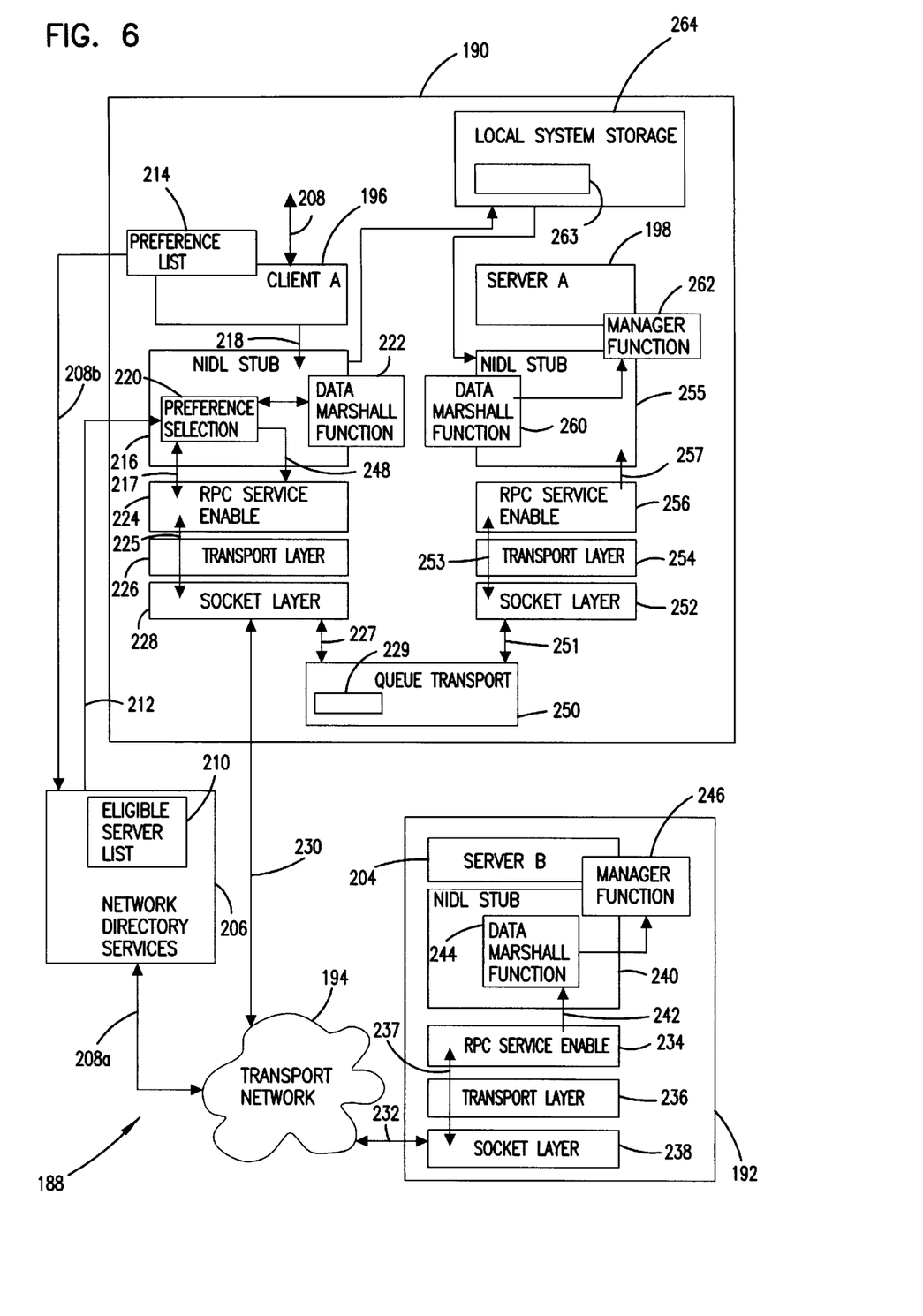
FIG. 6 is a flow diagram illustrating inter- and intra-platform data and communication paths of an alternate embodiment of the OPM call shown in FIG. 5 in which a preferred server transport list is used to permit selection of the server.

With reference now to FIG. 6, computer network 188 illustrates an alternate embodiment of the present invention used to enhance intra-platform communications by use of a preferential selection of eligible servers.

Computer network 188 includes first operating platform 190 and second operating platform 192 which are coupled by transport network 194. First operating platform 190 and second operating platform 192 may have different machine architectures and programming language implementations. Operating within first operating platform 190 are objects, such as client 196, which may require units of work from one or more other objects. Two such servers are shown, local server 198 operating within first operating platform 190 and remote server 204 operating within operating platform 192.

First operating platform 190 includes local system storage 264 which is shared by local objects, such as client 196 and local server 198. Local system storage 264 can be organized either as cells, each of which is assigned to a specific object, or a structured array where the application data of each RPC call is placed into the next available indexed slot, or as some other type of data structures.

In a conventional manner, the operational behaviors, expected input parameters and output results of local server 198 are defined as an interface using NIDL statements. These NIDL statements are compiled during a compilation time to produce source statements with predetermined programming language syntaxes. The source statements are then compiled using corresponding programming language compilers to form respective object modules of a server stub and a client stub.

Similarly, the operational behaviors, expected input parameters and output results of remote server 204 are defined as an interface using NIDL statements. These NIDL statements are then compiled to produce source statements which in turn are compiled using corresponding programming language compilers to form respective object modules of a server stub and a client stub.

The respective client stubs of local server 198 and remote server 204, represented together by block 216, are linked with client 196 in a conventional manner by combining respective object modules into an executable file.

The server stub produced from the interface of local server 198 is linked with local server 198 and with local server manager function 262 to form an executable file. Local server manager function 262 is a set of procedures that implement the operations defined in the interface of local server 198.

NIDL stub 240 is linked with remote server 240 and remote server manager function 246 to form an executable file. Remote server manager function 246 is a set of procedures that implement the operations defined in the interface of remote server 204.

Communication among the objects in computer network 188 is achieved by RPC calls. Communication of RPC calls to and/or from client 196 is performed by a network computing kernel (NCK) which includes client RPC service enabler 224. In sending an RPC call to a destination object, such as local server 198 or remote server 204, client RPC service enabler 224 chooses a transport server from client transport layer 226. In turn, the transport server chooses an appropriate socket from client socket layer 228 which represents the destination object. Client socket layer 228 is responsible for providing the necessary communication protocols to enable communication between client 196 and selected object.

Similarly, communication of RPC calls to and/or from local server 198 is also performed by an NCK which includes local server RPC service enabler 256. In sending an RPC call to a destination object such as client 196, local server RPC service enabler 256 chooses a transport server from local server transport layer 254. In turn, transport server chooses from local server socket layer 252 an appropriate socket which represents the destination object. Socket layer 252 is responsible for providing the necessary communication protocols to enable communication between local server 198 and the calling object.

Similarly, communication of RPC calls to and/or from remote server 204 is performed by the NCK which includes remote server RPC service enabler 234. In sending an RPC call to a destination object, such as client 196, remote server RPC service enabler 234 chooses a transport server from remote server transport layer 236. In turn, the transport server chooses from remote server socket layer 238 an appropriate socket which represents destination object. Remote server socket layer 238 is responsible for providing the necessary communication protocols to enable communication between remote server 204 and the destination object.

Computer network 188 includes directory services program 206 which maintains resource information for network 188. Directory services program 206 may be centrally maintained in one of the computers within the computer network 188 and/or replicated in whole or in part on each local platform. Directory services program 206 has a global database (not separately shown) for storing the locations of resources, such as local server 198 and remote server 204, throughout network 188.

At start-up time, local server stub 198 and local server manager function 262 each registers itself with local server RPC service enabler 256. Local server 198 also requests an address assignment from local server RPC service enabler 256. Upon receiving the address assignment, local server 198 registers itself and its attributes with network directory services program 206 to thereby make itself known to calling objects in computer network 188.

At start-up time, remote server stub 204 and remote server manager function 246 each registers itself with remote server RPC service enabler 234. Remote server 204 also requests an address assignment from remote server RPC service enabler 234. Upon receiving the address assignment, remote server 204 registers itself and its attributes with network directory services program 206 to thereby make itself known in computer network 188.

To request a unit of work, client 196 requests eligible server list 210 from network directory services program 206 using transport data path 208*a* or direct communication channel 208*b*. Eligible server list 210 contains the addresses of servers eligible to provide the requested unit of work. Selection of the preferred server from eligible server list 210 is made based upon preference list 214 which contains preferred transport choices for client 196. Preference list 214 is made available to client 196 through, for example, environmental variables, input parameters, or flat files. This implementation allows input to the selection process from the local network administrator and/or end-user who typically have better knowledge and insight concerning client and server configuration and the characteristics of the local platform. Each entry in preference list 214 includes address family, type and protocol of the corresponding server.

By way of example, preference list 214 may contain the following entries:
(INTRA, STREAM, QUEUE)
(UNIX, STREAM, PIPE)
(SNA, STREAM,CLDN)
(SNA, STREAM, APPC)
(SNA, DGRAM, *)
(TCP/IP, DGRAM, *)

In the above list, the first two entries, INTRA and UNIX, correspond to two local address families.

The order of preference of an entry is indicated by its position in the list. For example, since INTRA is listed at the top of preference list 214, if local server 198 appears in eligible server list 210 and if local server 198 is "listening" on the INTRA address family, then local server 198 is selected first. If no server is listening on the INTRA, the next preference (i.e., UNIX) is selected. The * in the last two entries demotes an open selection where any valid value is an acceptable choice.

Preference list 214 is passed from client 196 to client stub 216 as a set of parameters. Selection of a preferred server is performed by preference selection logic 220 within client stub 216 based upon eligible server list 210 sent from network directory services program 206 and preference list 214 sent from client 196.

When a server is selected, client stub 216 then invokes a RPC_Verify_Destination function, (not shown) incorporated in client RPC service enabler 224. The function of the RPC_Verify_Destination is to verify that a destination object's address family, type and protocol combination are indeed supported by first operating platform 190 so that the destination object can indeed be reached. The verification is performed using the address of the destination object as a parameter. Typically, for local address families such as INTRA and UNIX, the result of a verification is positive if an active server is listening on the exact server address. For other address families such as SNA, the result of the verification is positive as long as the address family, type and protocol combination are supported by local transport layer.

If preference selection logic 220 selects remote server 204, and if the verification by the RPC_Verify_Function indicates that the RPC call can indeed reach remote server 204, client stub 216 invokes client marshall/unmarshall function 222 to marshall the RPC call. After undergoing data marshalling, the RPC call is then passed to client RPC service enabler 224 through control path 217. Client RPC service enabler 224 invokes client transport layer 226 and client socket layer 228 through control path 225 to send the RPC call out.

Client socket layer 228 sends the RPC call to transport network 194 through data path 230. From transport network 194, the RPC call is sent through data path 232 to second operating platform 192 and is deposited into a socket in remote server socket layer 238. Remote server socket layer 238 passes the RPC call to remote server RPC service enabler 234 through data path 237.

Remote server RPC service enabler 234 then transfers execution control to remote server stub 240 through program control path 242. Remote server RPC service enabler 234 is able to locate remote server stub 240 because remote server stub 240 has registered itself with remote server RPC service enabler 234 at start up time.

Upon receiving control, remote server stub 240 invokes remote server marshall/unmarshall function 244 to convert the RPC. The RPC call is then processed by remote server manager function 246.

If a reply needs to be returned from remote server 204 to client 196, the reply is sent in the reverse direction along the same data path.

On the other hand, if local server 198 is selected by preference selection logic 220 and if the address family, type and protocol of local server 198 are indeed supported by local first platform 190, the RPC call is sent to client RPC service enabler 224 through data path 248 without invoking client marshalling/unmarshalling function 222. Client RPC service enabler 224 then invokes client transport layer 226 and client socket layer 228 to send the RPC call out.

An RPC call can be sent between client 196 and local server 198 in two ways. In one communication technique, client socket layer 228 passes the RPC call into memory location 229 in queue transport 250 though data path 227. The RPC call in location 229 is retrieved by local server socket layer 252 along data path 251. Local server socket layer 252 then passes the RPC call to local server RPC service enabler 256 along data path 253. Because local server 198 had registered itself with local server RPC service enabler 256 at start up time, local server RPC service enabler 256 is able to identify local server stub 284 as the recipient of the RPC. Local server RPC service enabler 256 then transfers execution control to local server stub 284 along program control path 257. When local server stub 284 receives execution control, it invokes local server manager function 262 to process the RPC. Local server marshall/ unmarshall function 280 is bypassed.

In another communication technique, instead of passing the RPC call through queue transport 250, the RPC call is placed by client stub 216 into location 263 in local system storage 264. When the RPC call is placed into local system storage 264, a pointer which identifies location 263 is returned to client stub 216. The pointer is incorporated into the handle of the RPC.

To send the RPC call, instead of copying the RPC call to queue transport 250, client socket layer 228 passes only the handle to queue transport 250. The handle is retrieved from queue transport 250 by local server socket layer 252.

Local server socket layer 252 then passes the handle to local server RPC service enabler 256. Local server RPC service enabler 256 then transfers execution control to local server stub 255. When local server stub 255 receives execution control, it uses the pointer in the handle to retrieve the RPC call from local system storage 264. Local server stub 255 then invokes local server manager function 262 to process the RPC. Local server marshall/unmarshall function 260 is bypassed since the RPC call is originated from local client 196.

If a reply needs to be returned from local server 198 to client 196, it is sent through the same data path as the request but in the reverse direction.

RPC communication from client 196 to local server 198 can also be performed through transport network 194, for example, by selection of the TCP/IP address family. In this route, communication between client 196 and local server 198 is handled in the same manner as between client 196 and remote server 204.

If communication under any one of the above scenarios fails, client 196 is responsible for recovery from communication failure and unsuccessful server connection. During the recovery, client 196 adjusts eligible server list 210 and re-initiates the RPC.

Although a generalized embodiment using intra-platform and internal messaging in combination with a inter-platform messaging operating in a conventional manner has been shown, it is well within the skill of a person of ordinary skill in this art to utilize the present invention in various specific applications in other particular and specialized manners. The specific embodiments described herein are intended to provide a convenient example illustrating the development use and operation of the present invention and may not be used to limit the scope of the invention which is defined by the claims hereafter appended.

What is claimed is:

1. A method of operating a plurality of operating platforms as a computer network to facilitate communications between a client and a plurality of servers, comprising the steps of:

selecting an eligible server from a plurality of servers in response to a service request from a client on a first platform, further comprising the steps of storing an order of preference for said servers and selecting the eligible server from the plurality of servers in accordance with said order of preference;

automatically determining if the selected server is not on the first platform;

automatically selecting the use of a network transport between operating platforms to communicate between the client and the selected server if the selected server is determined to not be on the first platform; and automatically selecting the use of a memory queue on the first platform to communicate between the client and the selected server if the selected server is determined to be on the first platform, further comprising:

storing a portion of the service request from the client in local system storage;

passing request handle data regarding said service request storage from the client to the selected server via the memory queue;

retrieving said portion of the service request from the local system storage by the selected server in response to said request handle data;

storing a portion of reply data from said selected server in said local system storage;

passing reply handle data regarding said reply storage from said selected server to said client via the memory queue; and retrieving said portion of said reply data from the local system storage by the client in accordance with said reply handle data.

2. The method of claim 1, wherein the step of storing an order of preference for said servers further comprises the step of:

ordering said servers in accordance with the desirability of use of transport mechanisms providing communication with each of said servers.

3. The method of claim 1, wherein the step of selecting an eligible server in accordance with said order of preference further comprises the steps of:

determining the availability of said eligible servers in accordance with said order of preference; and selecting the first eligible server determined to be available.

4. The method of claim 2, wherein the step of using a memory queue further comprises the step of:

communicating between said client and servers without data marshalling.

5. A method for requesting service from a server in a computer network environment, comprising the steps of:

requesting a specified service for a client on a first platform in said computer network environment;

obtaining a list of eligible servers from a network services directory in response to said request;

selecting an available server from said list of eligible servers in response to said request further comprising the steps of storing an order of preference for said eligible servers and selecting an available, eligible server in accordance with said order of preference;

automatically selecting the use of a remote procedure call to request service from said available eligible server if said available, eligible server is determined to not be on said first platform;

automatically placing said request for service on a memory queue in said first platform if said available, eligible server is determined to be on said first platform, further comprising the steps of:

storing a data portion of said request for service in memory on said first platform at a first memory address;

communicating said first memory address to said available server on said memory queue; and    retrieving said data portion from said first memory address to provide said requested service;

applying said service request to said eligible server on said first platform;

storing results from said requested service at a second memory address on said first platform; and    retrieving said results from said second memory location to complete said request for service.

6. The method of claim 5, wherein the step of selecting an available server from said list of eligible servers further comprises the step of:

selecting said available server from said list of eligible servers in accordance with an order of preference of transport mechanisms usable to communicate with said servers.

* * * * *